(12) United States Patent
Stiewe

(10) Patent No.: US 8,844,875 B1
(45) Date of Patent: *Sep. 30, 2014

(54) TRACTION KITE WITH HIGH PROJECTED LEADING EDGE

(75) Inventor: Peter Stiewe, Rodanthe, NC (US)

(73) Assignee: Ride Best, LLC, North Carolina, FL (US)

( * ) Notice: Subject to any disclaimer, the term of this patent is extended or adjusted under 35 U.S.C. 154(b) by 90 days.

This patent is subject to a terminal disclaimer.

(21) Appl. No.: 13/531,819

(22) Filed: Jun. 25, 2012

Related U.S. Application Data

(63) Continuation-in-part of application No. 13/178,942, filed on Jul. 8, 2011, now Pat. No. 8,534,609.

(60) Provisional application No. 61/362,463, filed on Jul. 8, 2010.

(51) Int. Cl.
*B64C 31/06* (2006.01)

(52) U.S. Cl.
USPC .................... 244/153 R; 244/155 A; 244/145

(58) Field of Classification Search
USPC .............................. 244/153 R, 142, 145, 146
See application file for complete search history.

(56) References Cited

U.S. PATENT DOCUMENTS

| | | | | |
|---|---|---|---|---|
| 1,486,368 | A * | 3/1924 | Eckmann .................... | 244/153 R |
| 3,298,635 | A * | 1/1967 | Barish ......................... | 244/35 R |
| 3,309,045 | A * | 3/1967 | Kinney ....................... | 244/153 R |
| 4,708,078 | A | 11/1987 | Legaignoux et al. | |
| 4,846,424 | A * | 7/1989 | Prouty ....................... | 244/153 R |
| 5,328,134 | A * | 7/1994 | Powers ..................... | 244/155 A |
| 5,368,259 | A * | 11/1994 | Tabor ........................... | 244/145 |
| 6,520,454 | B2 * | 2/2003 | Winner ...................... | 244/155 A |
| 7,032,864 | B2 * | 4/2006 | Logosz ....................... | 244/153 R |
| 7,093,803 | B2 * | 8/2006 | Culp .......................... | 244/153 R |
| 7,374,133 | B2 * | 5/2008 | Legaignoux et al. ......... | 244/145 |
| 2003/0111578 | A1 * | 6/2003 | Ito et al. .................... | 244/153 R |
| 2004/0065780 | A1 * | 4/2004 | Bellacera .................. | 244/155 A |
| 2004/0113019 | A1 * | 6/2004 | Lynn ......................... | 244/153 R |
| 2005/0230556 | A1 * | 10/2005 | Legaignoux et al. ..... | 244/153 R |
| 2006/0192055 | A1 * | 8/2006 | Shogren ........................ | 244/145 |
| 2007/0187553 | A1 * | 8/2007 | Legaignoux et al. ..... | 244/153 R |
| 2009/0152391 | A1 * | 6/2009 | McWhirk ....................... | 244/30 |
| 2009/0179112 | A1 * | 7/2009 | Gu ............................ | 244/153 R |
| 2009/0277997 | A1 * | 11/2009 | Shogren et al. ........... | 244/153 R |
| 2012/0193482 | A1 * | 8/2012 | Harrington ............... | 244/153 R |

OTHER PUBLICATIONS www.globekites.com; http://www.globekites.com/gkblog/?p=6 Please see three photographs filed herewith in connection with the above website.
vvww.kiteboardingevolution.com Please see attached 11 pages of screenshots filed herewith as IDSAttachment4.

* cited by examiner

*Primary Examiner* — Christopher P Ellis
*Assistant Examiner* — Medhat Badawi
(74) *Attorney, Agent, or Firm* — Mark D. Bowen; Malin Haley DiMaggio & Bowen, P.A.

(57) ABSTRACT

A traction kite having a variable geometry leading edge that defines a high projected central propulsive region of increased surface area along the top portion of the kite, and lateral control regions of decreased surfaces area extending on opposite sides of the propulsive region. The leading edge thus defines a concave shape when viewed from the side while in flight. Providing a variable geometry leading edge maximizes propulsive forces due to increased surface area, while enhancing control and turning performance by minimizing the surface area of the control regions, namely those generally vertically disposed regions that begin at the tips and end at the propulsive region.

10 Claims, 3 Drawing Sheets

TRACTION KITE WITH HIGH PROJECTED LEADING EDGE

CROSS REFERENCE TO RELATED APPLICATIONS

This application is a continuation-in-part of U.S. patent application Ser. No. 13/178,942, filed Jul. 8, 2011, which claims the benefit of provisional U.S. Patent Application Ser. No. 61/362,463, filed on Jul. 8, 2010.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates to propulsive wings and traction kites, used for applying a traction force and/or pulling a load. More particularly the present invention relates to a sport traction kite having a generally tubular inflatable leading edge that is concave when viewed from the side in flight mode.

2. Description of Related Art

The use of kites as a means of propulsion has existed for over a century. Kites were first used as a means of propulsion in pulling boats. The use of sport kites in water and land based activities, such as kiteboarding and snowboarding, has grown tremendously in recent years. These sports adapt the principals of surfing and snowboarding to include kites as a method for generating propulsion, speed, and elevation. A number of advances in kite design have led to improvements in safety, attainable speeds, and overall performance.

Most sport traction kites currently used in board sports are constructed with flexible canopy having an inflatable leading edge armature which distributes loads via ropes attached along the leading edge and at the lateral ends. As used therein the terms "sport kite," "traction kite," or "kite" shall mean a propulsive wing that harnesses wind power to pull a rider over or through, land, water, or snow on a riding platform (e.g. a board). A traction kite of this type is described in U.S. Pat. No. 4,708,078 to Legaignoux et al., wherein a basic design for a leading edge inflatable ("LEI") kite is disclosed. Legaignoux discloses a traction kite having a leading edge with an inflatable leading edge armature covered by a flexible envelope.

As kite sports have evolved, demand for kites with improved performance characteristics has grown. Specifically, kite users desire kites with improved handling and control, faster turning speeds, and more responsive control achieved with minimal user input force. As a result, several different types of leading edge inflatable kites have been developed. The C-kite is the most common kite design that has been available for the longest period of time. It is named for the arc-like shape it forms while in flight which resembles the letter "C". The attachment of four lines at the four corners of the kite cause the kite to arc sharply while in flight. When viewed from overhead, the C-kite characteristically forms a convexly shaped trailing edge. FIG. 1 depicts a side view of a prior art C-kite, generally referenced as 1, having an inflatable leading edge 2, a trailing edge 3, and a canopy 4, supported by inflatable struts or ribs 5. A slight variation of the C-kite is the $5^{th}$ line C-kite which includes an extra line attached at the middle of the leading edge of the kite. The sole purpose of the $5^{th}$ line is to assist the rider in de-powering and re-launching the kite. De-powering is essentially a safety mechanism for the rider which reduces the propulsive surface area thereby reducing the force of the wind on the kite and the lines.

A recent innovation in kite design was the introduction of the Bow kite. The Bow kite has two defining characteristics which differentiate it from the C-kite: 1) the trailing edge of the bow kite is concave; and 2) the Bow kite is controlled by a series of control lines, commonly referred to as a bridle. The bridle is affixed to the kite in a web-like fashion and causes the kite to possess a flatter shape when in flight. The concave trailing edge and the addition of the bridle to the leading edge of the kite allow the kite to be de-powered with ease thus eliminating the need for a $5^{th}$ line. Furthermore, these features allow the bow kite to be adaptable to varying wind speeds, whereas the C-kite's design relegates it to specific wind speeds. U.S. Pat. No. 7,374,133, issued to Legaignoux et al., provides an example of a conventional Bow kite.

Even more recently hybrid kites have been produced which combine elements of both the C-kite and the Bow kite. Although there are various forms of hybrid kites, all of the known versions are characterized as having convex trailing edge and a leading edge bridle. The convex trailing edge is adapted from the C-kite and the leading edge bridle and bow configuration is adapted from the Bow kite. The hybrid kite achieves a middle ground between the C-kite and the Bow kite. It possesses a greater ability to de-power than the C-kite, but also allows for a greater performance and turning capability than the Bow kite.

In general there has been an increased demand for fraction kites having improved performance characteristics for use in kite sports, such as kiteboarding and snowkiting (a/lda snow kiteboarding). The curvature of the vertical leading edge of the kite in flight affects the performance of the kite. The angle and radii of curvature from the bridle tie-lines to the top of the kite dictate the size of the surface area of the central propulsive region. The greater the surface area, the greater the performance of the kite.

As stated in the aforementioned background, the curvature of the various edges of the kite affects the performance characteristics that the kite will possess. The Bow kite handles a myriad of wind velocities and can be easily depowered due to a concave trailing edge. Likewise, the C-kite's convex trailing edge gives the rider a more direct feel when riding and provides greater responsiveness to rider maneuvers. Furthermore, it is well known that a convex leading edge is the most effective design for all supported leading edge kites.

One known prior art kite, sold by Globe Kites, under the designation V-SONIC, wherein a small projecting V-shape was fowled at the mid-point of the leading edge. While providing a marginal increase in surface area, the V-SONIC kite failed to achieve significant performance enhancement since the wingtips were swept back as was customary on Bow and hybrid kites. As a result, the V-SONIC kite failed to realize gains and advantages in performance characteristics relating to fast and responsive turning as the V-SONIC kite leading edge, when viewed from the side, extends from the propulsive region to the tip in a liner shape and thus fails to maximize the surface area transition between the propulsive center region.

The prior art fails to disclose or suggest a propulsive wing in which the curvature of the vertical portion of the leading edge of the kite is concave when viewed from the side in flight mode. This curvature also lends itself greatly to the performance of the kite. There is therefore a need for a propulsive wing with an inflatable support structure that is designed to maximize the surface area of the central propulsive region, while still providing a responsive and easily-controllable kite.

BRIEF SUMMARY OF THE INVENTION

The present invention overcomes the disadvantages and limitations of the prior art by providing a leading edge inflatable traction kite that defines a projected leading edge, namely a leading edge that, when viewed from the side while in flight, is concavely shaped. The present invention thus provides a traction kite wherein the surface area is maximized in a propulsive region formed along the central region of the leading edge (or top part of the kite) and minimized in control regions disposed on either side of the propulsive region and terminating at the kite/wing tips.

Accordingly, it is an object of the present invention to provide a leading edge inflatable traction kite having a larger central propulsive region for towing a load.

Another object of the present invention is to provide a leading edge inflatable traction kite that overcomes the less responsive turning characteristics and lower efficiency of the prior art.

Still another object of the present invention to provide a leading edge traction kite that provides optimum performance characteristics, in particular maximizing propulsive forces while maintaining the ability to perform quick turns and maneuvers.

It is furthermore another object of the present invention to provide a leading edge inflatable traction kite that is inexpensive to manufacture, therefore allowing for widespread distribution.

These and other objects are met by the present invention which will become more apparent from the accompanying drawing and the following detailed description of the drawings and preferred embodiments.

DETAILED DESCRIPTION OF THE INVENTION

Figure 1:
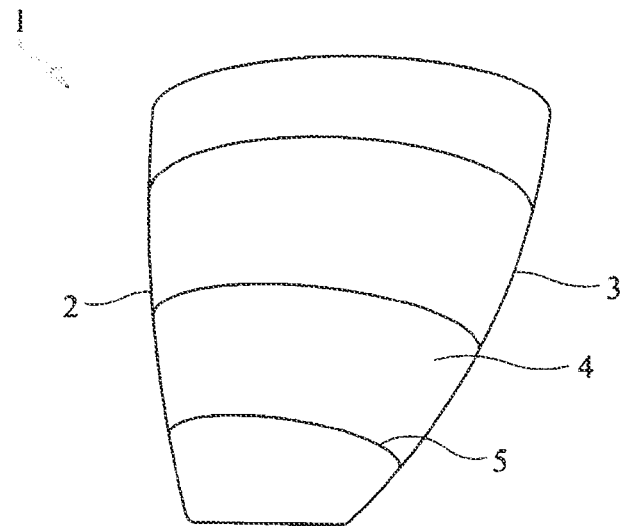
FIG. 1 is a side elevation view of an traction kite with an inflated leading edge in accordance with the prior art.
Figure 2:
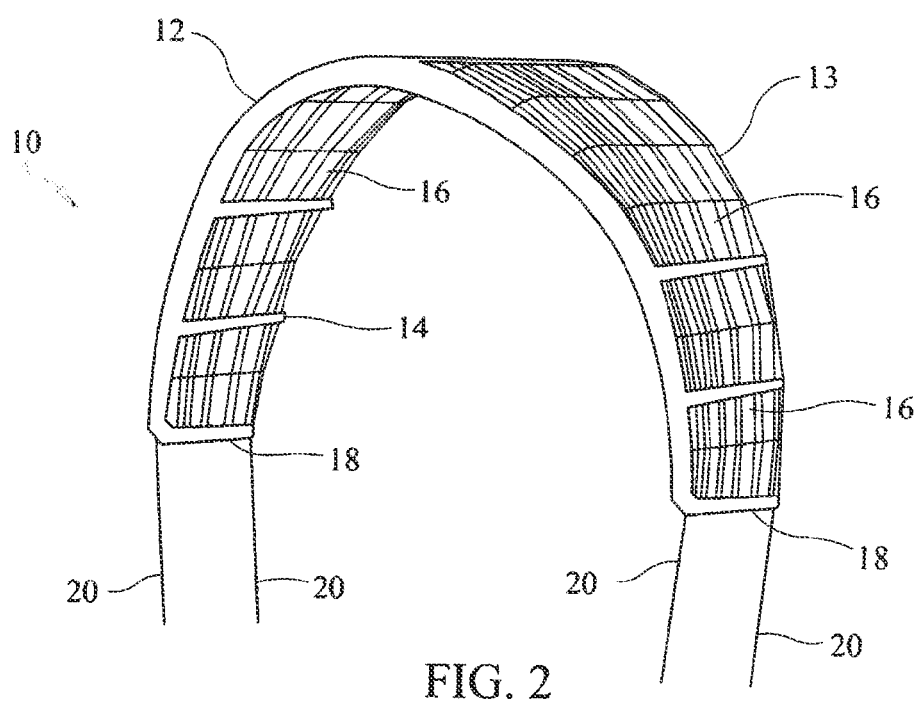
FIG. 2 is a front perspective view of an inflated leading edge traction kite in accordance with the present invention fitted with control lines.

With reference now to the drawings, FIGS. 2-6 depict a traction kite in accordance with the present invention. Traction kite 10 includes an inflatable, elastically deformable leading edge spar 12 extending across the entire longitudinal front side of kite 10. Leading edge spar 12 comprises an inflatable tubular structure. A series of inflatable struts or ribs 14 extend generally perpendicularly from the inflatable leading edge 12 towards the trailing edge 13 of the kite 10. Inflatable ribs 14 are preferably in fluid communication with leading edge 12 such that inflation of leading edge 12 causes inflation of ribs 14. Leading edge 12 and ribs 14 form the support structure for the canopy 16 of kite 10. Canopy 16 is connected to and extends between parallel ribs 14 and the leading edge strut 12 as is generally known in the art. Leading edge 12 and canopy 16 serve as the main surfaces over which air flows, leading to the creation of an area of low pressure over the top of the canopy 16 and an area of high pressure beneath the canopy 16 such that kite 10 aerodynamically functions as a wing. Kite 10 further includes lateral ends or tips 18.

A plurality of control lines 20 may be connected to the tips 18 and for leading edge 12 of kite 10. Kite 10 may be fitted with any suitable configuration of control lines, including a four (4) line configuration, a $5^{th}$ line configuration, or a bridle configuration wherein a plurality of control lines are attached along the leading edge. In the preferred embodiment illustrated in FIG. 2, kite 10 may be fitted with a four (4) line control system, with two (2) lines attached to each wing tip 18 (namely the four outermost corners when the kite 10 is laid flat), and no lines are attached to the leading edge. The four tie lines allow the rider to selectively apply control forces to portions of kite 10. These applied control forces, cause the kite 10 to deform thus changing the angle of attack. The arrangement of lines may vary; in an alternative embodiment the inventor contemplates the existence of a series of control lines arranged in a web-like fashion, commonly referred to as a bridle. Changing the angle of attack changes the aerodynamic characteristics of kite 10 thereby causing it to turn, or depower, or increase power, depending on the resulting angle of attack. For example, lowering the angle attack on one side of the kite 10 lowers the pressure difference on that side of the kite 10 thereby reducing the propulsive force generated and causing the kite 10 to turn in a direction towards the side with the higher angle of attack. Through this mechanism, the direction in which the kite 10 is flying is controlled thereby allowing the kite to be maneuvered in kite propulsion based sports. As should be apparent, any suitable bridle and control line configuration is considered suitable for use with a kite 10 of the present invention.

A significant aspect of the present invention involves providing a traction kite 10 having improved performance and control characteristics, namely, the ability to quickly turn and change direction in response to the rider's control motions and selective application or reduction of force. This characteristic is directly related to how quickly and easily the angle of attack of the kite 10 is changed. The degree and speed by which the angle of attack is changed largely depends the curvature of the leading edge 12 of the kite 10.

Figure 3:
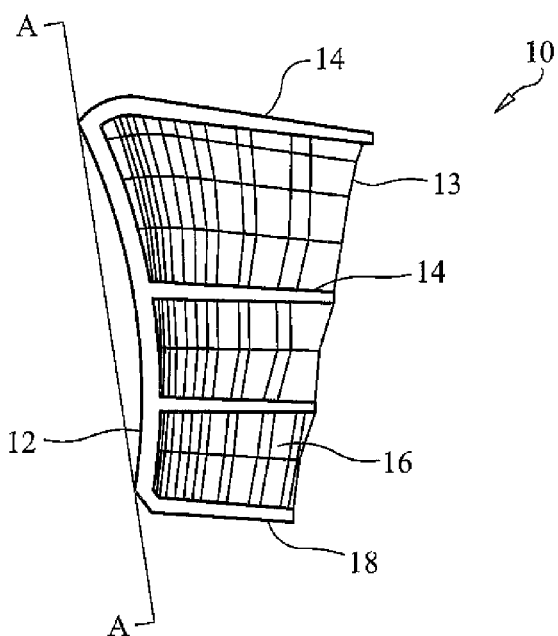
FIG. 3 is side view of the inflated leading edge traction kite in accordance with the present invention illustrating the concave leading edge.

Kite 10 of the present invention defines a convex leading edge shape when the kite 10 is viewed from overhead, and further defines a concave leading edge shape when the kite 10 is viewed from the side while it is in flight. Accordingly, a significant aspect of the present invention involves providing a kite 10 that has a concave leading edge 12 when the structure is viewed from the side while in flight. FIG. 3 best illustrates the leading edge geometry wherein the leading edge is depicted as significantly concave as seen with the aid of reference line A-A. More particularly, a variable geometry leading edge 12 provides kite 10 with a high projected central propulsive region of increased surface area along the top portion of the kite (e.g. the central or mid-portion) resulting in increased propulsive force thereby allowing the kite to have a greater efficiency with respect to harnessing the power of the wind. Further, the variable geometry leading edge 12 provides kite 10 with a concave leading edge 12 extending from the leading edge centerline to the tip 18 when the kite is viewed from the side when deployed in flight. The concave shaped defined by leading edge 12 preferably defines an arcuate or curved profile extending from the centerline of the kite to the tip or end of the leading edge. Providing kite 10 with a concavely curved leading edge profile is seen in FIG. 3, functions to maximize control and turning performance by minimizing the surface area of the control regions, namely those generally vertically disposed regions that begin at the tips and end at the propulsive region.

Accordingly, the present invention differs from the prior art, FIG. 1, with respect to the curvature of the leading edge 12. The kite of the prior art (FIG. 1) comprises a generally straight leading edge which offers little benefit from a performance standpoint. Kite 10 further differs significantly from the Globekites V-SONIC kite wherein the leading edge if viewed from the side extends from the propulsive region to the tip in a liner shape. The kite 10 of the present invention may be best characterized as a C-kite hybrid because it is sharply curved in-flight. In a preferred embodiment, the trailing edge 13 is relatively straight, but it may be contemplated that the trailing edge be convex similar to that of a C-kite. Through the curved design of the inflatable leading edge strut 12, a traction kite 10 with maximized performance characteristics, and in particular turning ability, is achieved.

Figure 4:
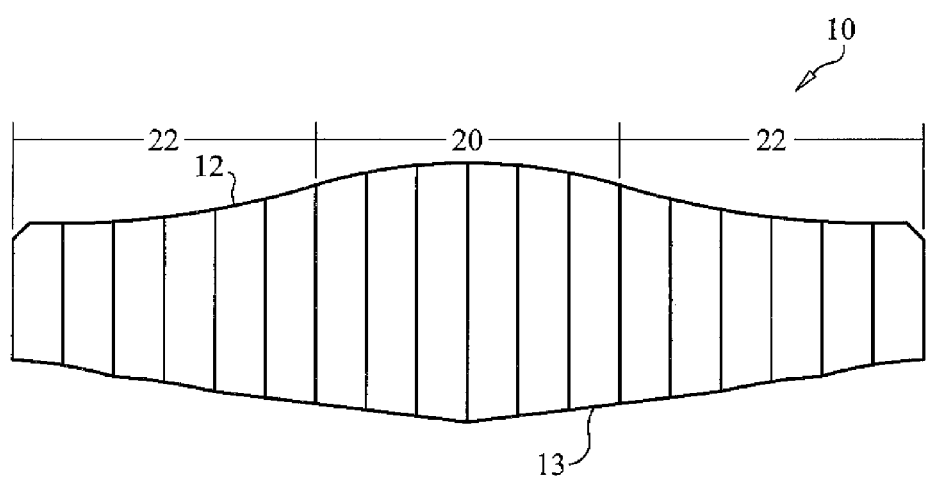
FIG. 4 is a plan view of the inflated leading edge traction kite in accordance with the present invention spread out on a flat surface.

FIG. 4 further illustrates the kite geometry of traction kite 10 as if it is spread out on a flat surface in order to illustrate the existence of an enlarged propulsive region, referenced as 20, as compared to the control regions referenced as 22. The top section of the traction kite 10 is the part which achieves the highest efficiency with respect to harnessing the force of the wind. The design of the present invention provides a propulsive section with a maximized surface area. The vertical curvature of the leading edge 12 allows the rider to maintain a responsive turning character by providing a standard four-line arrangement while enlarging the propulsive region to maximize efficiency.

Figure 5:
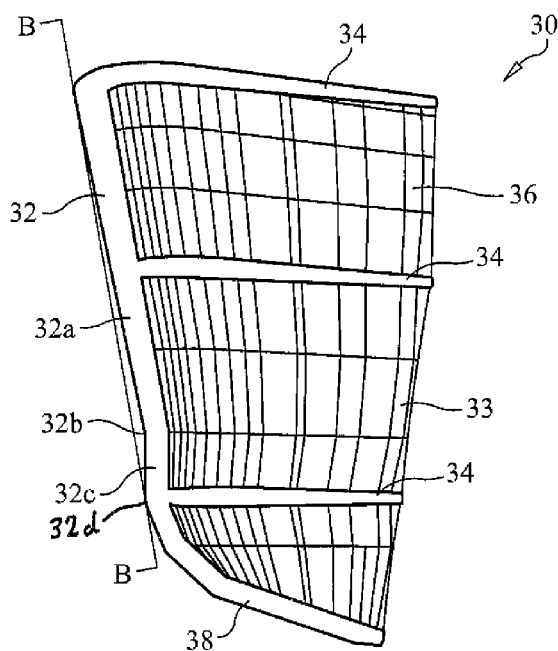
FIG. 5 is a side view of a fraction kite having an alternate embodiment concave leading edge shape.
Figure 6:
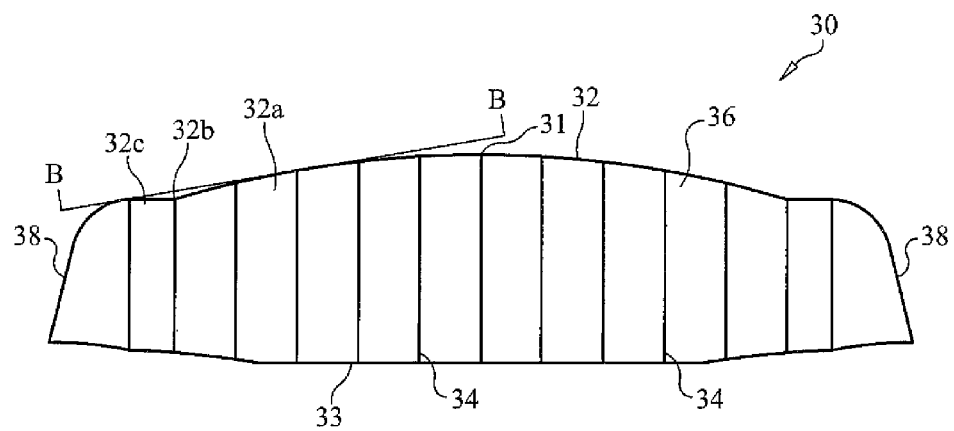
FIG. 6 is a top view thereof with the kite spread out on a flat surface.

FIGS. 5 and 6 depict an alternate embodiment traction kite, generally referenced as 30, in accordance with the present invention. As with the embodiment depicted in FIGS. 2-4, traction kite 30 includes an inflatable, elastically deformable leading edge 32 extending across the entire longitudinal front side of kite 30. Leading edge 32 comprises an inflatable tubular structure and has a centerline 31, namely a midpoint. In addition, a series of inflatable ribs 34 extend generally perpendicularly from the inflatable leading edge 32 towards the trailing edge 33 of the kite 30. Inflatable ribs 34 are preferably in fluid communication with leading edge 32 such that inflation of leading edge 32 causes inflation of ribs 34. Leading edge 32 and ribs 34 form the support structure for the canopy 36 of kite 30. Canopy 36 is connected to the leading edge 32 and ribs 34 as is generally known in the art. As best seen in FIG. 5, traction kite 30 further includes lateral ends or tips 38 which may be formed by forming the leading edge with a rearwardly turned end portion (e.g. a bend in the leading edge strut generally toward the trailing edge, or tips 38 may be formed by the outermost ribs. Kite 30 defines tips 38 that are shaped slightly different that the tips 18 of the kite shown in FIGS. 2-4. As best seen in FIG. 5, the tip 38 of kite 30 is swept and generally diverges from the adjacent rib 34.

As with the first disclosed embodiment, kite 30 has a leading edge defining a concave shape along at least a portion thereof. FIGS. 5 and 6 illustrate the leading edge geometry wherein a portion of leading edge 32 is shown as being significantly concave as seen with the aid of reference line B-B. A significant aspect of this embodiment involves providing traction kite 30 having a leading edge 32 that defines an irregular concave shape. As best seen in FIG. 5, leading edge 32 includes a first portion 32a that sweeps rearward (i.e. in the direction of the trailing edge) from the centerline of kite 30 (uppermost portion of leading edge in FIG. 5) until it reaches an apex of the concavity, referenced as 32b (e.g. point of maximum separation between the leading edge and reference line B-B). Accordingly, a significant aspect of kite 30 involves locating the apex of concavity 32b at a position along the leading edge that, when measured from the tip 38, is positioned at a distance that is less than one-third (⅓) of the total distance from the tip to kite centerline. Reference 32d represents the point wherein reference line B-B is tangential to the leading edge. The portion of the leading edge, referenced as 32c, which extends from apex 32b toward the tip 38 (e.g. in the outboard direction), has a reduced sweep such that the sweep of leading edge portion 32c reduces (as compared with the sweep of leading edge portion 32a) as the leading edge extends outward from the apex 32a of the concavity. The reduction in sweep may be of a degree so as to result in leading edge portion 32c defining a reverse sweep (e.g. forward swept).

The present invention contemplates various leading edge shapes wherein a concave region is formed between the centerline of the kite and each tip. The concave shape of the leading edge may be irregular as shown in FIG. 5, or regular in geometrical shape. In the embodiment depicted in FIG. 5, the leading edge 32 defines an irregular concave shape wherein leading edge portion 32a is significantly longer than leading edge portion 32c. As noted above, however, the respective lengths of leading edge portions 32a and 32b may vary from that shown in FIGS. 5 and 6 while still forming an irregular or regular concave profile while the kite is in flight. A traction kite in accordance with the present invention provides improved performance by maximizing the kite surface area in a propulsive region formed along the central region of the leading edge (or top part of the kite) and minimizing surface area in the control regions disposed on either side of the propulsive region.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A traction kite comprising:
an inflatable leading edge disposed at the forward most portion of the kite;
a plurality of inflatable ribs extending rearward from said leading edge;
a canopy attached to said leading edge and projecting rearward therefrom, said canopy terminating in a trailing edge;
a portion of said leading edge defining a concave shape when viewed from the side while in flight.

2. A traction kite according to claim 1, wherein said leading edge concave shape defines an apex.

3. A traction kite according to claim 1, wherein said leading edge concave shape extends from proximately a centerline of the leading edge to proximately a tip of the leading edge on each side of the leading edge centerline.

4. A traction kite comprising:
an inflatable leading edge disposed at the forward most portion of the kite, said leading edge having a centerline and opposing end tips, a plurality of inflatable ribs extending rearward from said leading edge, and a canopy connected to said leading edge and said ribs, said canopy terminating in a trailing edge;

said leading edge having at least a portion thereof, disposed between said centerline and each one of said tips, defining a generally concave profile having an apex when the traction kite is viewed from the side while in flight;

said apex located from said tip less than one-third of the distance to said centerline.

5. A traction kite according to claim 4, wherein said concave profile is irregular.

6. A traction kite according to claim 4, wherein said leading edge portion disposed between said apex and said tip has a reduced backward sweep as compared with the leading edge portion disposed between said centerline and said apex.

7. A traction kite according to claim 4, wherein said trailing edge defines a generally linear profile from the side view when in flight.

8. A traction kite comprising:

an inflatable leading edge disposed at the forward most portion of the kite, said leading edge having opposing tips and a centerline disposed between said tips, a plurality of inflatable ribs extending rearward from said leading edge, and a canopy connected to said leading edge and said ribs, said canopy terminating in a trailing edge;

said leading edge having defining a generally concave profile when viewed from the side while the traction kite is in flight;

said concave profile including an apex with a first portion of said leading edge extending between said centerline and said apex, and a second portion of said leading edge extending between said apex and said tip;

said first portion of said leading edge being backward swept;

whereby said leading edge and said canopy define a propulsive region along the top portion of the kite wherein surface area is maximized, and lateral control regions on opposite sides of said propulsive region wherein surface area is minimized.

9. A traction kite according to claim 8, wherein said apex is spaced from said tip less than one-third of the distance to said centerline.

10. A traction kite according to claim 8, wherein said second portion of said leading edge is forward swept.

\* \* \* \* \*